United States Patent [19]
Zyskind

[11] Patent Number: 6,008,915
[45] Date of Patent: *Dec. 28, 1999

[54] METHOD OF IDENTIFYING FAULTS IN WDM OPTICAL NETWORKS

[75] Inventor: John Lehrer Zyskind, Shrewsbury, N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/733,591

[22] Filed: Oct. 18, 1996

Related U.S. Application Data

[60] Provisional application No. 60/023,665, Feb. 16, 1996.

[51] Int. Cl.$^6$ .................................................. H04B 10/02
[52] U.S. Cl. ......................... 359/110; 359/124; 359/174; 359/177
[58] Field of Search ........................... 359/110, 124–134, 359/174–179, 333–349

[56] References Cited

U.S. PATENT DOCUMENTS

| | | | |
|---|---|---|---|
| 5,117,303 | 5/1992 | Desuruire et al. | 359/341 |
| 5,128,800 | 7/1992 | Zirngibl | 359/341 |
| 5,513,029 | 4/1996 | Roberts | 359/177 |
| 5,654,816 | 8/1997 | Fishman | 359/177 |

*Primary Examiner*—Edward Lefkowitz
*Attorney, Agent, or Firm*—Brian K. Dinicola; Jeffery J. Brosemer

[57] ABSTRACT

In a WDM network employing optical amplifiers, a method of detecting changes in the number of channels present in erbium doped fiber amplifiers (EDFA) that are caused by faults or system reconfigurations. In accordance with the technique of the present invention, the power of one signal channel and the power of the amplified spontaneous emission generated by the local EDFA's are monitored.

16 Claims, 3 Drawing Sheets

UPSTREAM LOSS MEASUREMENT

METHOD OF IDENTIFYING FAULTS IN WDM OPTICAL NETWORKS

CROSS-REFERENCE TO RELATED PROVISIONAL APPLICATION

This application claims the benefit of the Feb. 16, 1996, filing date of Provisional Application Ser. No. 60/023,665 entitled "Method Of Identifying Faults In WDM Optical Networks."

ACKNOWLEDGEMENT OF GOVERNMENTAL RIGHTS

This invention was made with Government support under Agreement No. MDA 972-94-3-0036 awarded by ARPA. The Government has certain rights in the invention.

FIELD OF THE INVENTION

The present invention relates generally to optical fiber communication networks and, more particularly, to systems and methods for monitoring the performance characteristics of fiber links employed in such networks.

BACKGROUND OF THE INVENTION

In WDM optical networks, which are based on the optical transparency offered by erbium doped fiber amplifiers (EDFA's) a number of signal channels can be transmitted simultaneously and routed independently. In such a network, it is desirable to ensure that when channels are added or dropped, which can result from changes in provisioning or network reconfigurations, as well as from network faults, the performance of the surviving channels will be not impaired. Because of the saturation characteristics of EDFA's this requires readjusting the EDFA gains to maintain channel power levels within acceptable limits.

Changes in provisioning and/or network reconfiguration can give rise to added or dropped channels, but these changes can in principle be predicted and corrected for by the network control and management (NC&M) system. However, it remains necessary to detect conditions arising from system faults because these cannot be controlled or predicted by the NC&M system. Such faults are most likely to result from channel failures or degradation in the optical transmission path. When these two problems happen, it is critical they be detected so that proper measures can be taken.

Monitoring the power of only one channel or the total power of all the channels does not provide sufficient information to determine the appropriate corrections. Variations of upstream optical losses or the output powers of upstream amplifiers which may occur cannot be distinguished from dropped/added channels but call for very different corrective actions. The proper way is to determine the number of channels present. One possibility is to demultiplex the channels (either in the transmission path or after a tap) and detect the presence of each channel independently. However, this method is complicated and expensive.

SUMMARY OF THE INVENTION

In accordance with the present invention, the aforementioned deficiencies are overcome and an advance is made in the art by a method in which changes in the number of channels and changes in power common to all of the channels are monitored.

Such detection is possible because the signal power transmitted through the system and the amplified spontaneous emission (ASE) power generated by the local EDFA behave similarly when the number of channels is changed but differently when the upstream loss varies. That is, if the upstream loss changes, the changes in power of the monitor channel and the ASE are in opposite directions. If one or more channels are added or dropped, the changes in power experienced by the monitor channel and the ASE are in the same direction.

BRIEF DESCRIPTION OF THE DRAWINGS

The above features and advantages of the present invention will become apparent from the ensuing description of several preferred exemplary embodiments, which should be read in conjunction with the accompanying drawings, in which.

DETAILED DESCRIPTION OF THE INVENTION

Figure 1:
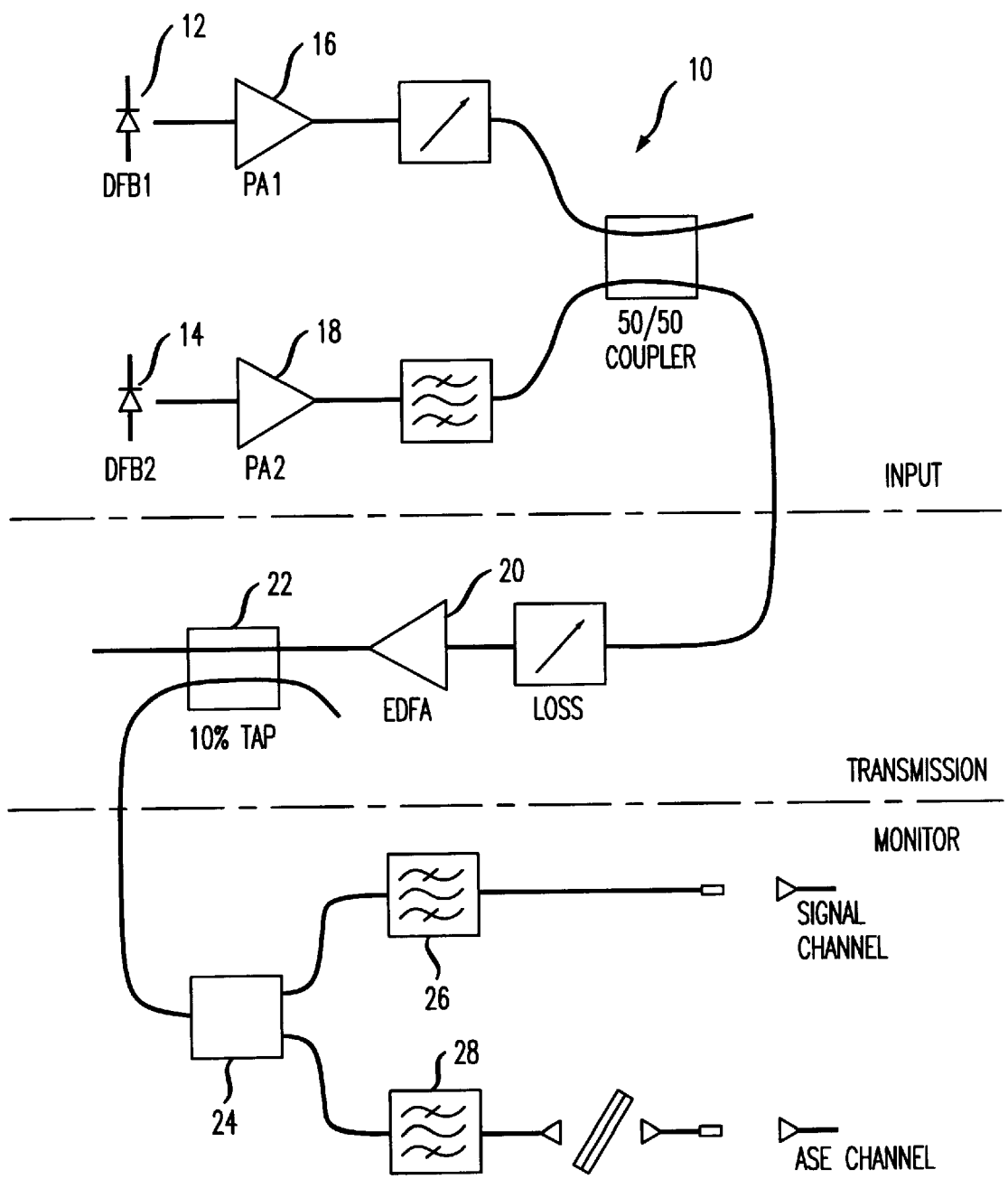
FIG. 1 depicts an illustrative optical network employing a first distributed feedback (DFB) laser as a multiple signal channel source and a second DFB laser as a monitor channel source in accordance with the present invention.

An illustrative WDM optical network 10 is shown schematically in FIG. 1. As seen in FIG. 1, a first DFB laser 12 operating at 1552.6 nm serves as the source for the monitor channel, while a second DFB laser 14, operating at 1557.8 nm, serves to simulate the other signal channels. Two mid-amplifier pumped, two stage EDFA's [16, 18] with dual 980 nm pumps were used to amplify the light from DFB lasers so that suitable amount of input powers could be obtained in each channel. The input powers were set corresponding to a network with eight signal channels each having a power of −3.5 dBm at the input end of the illustrative EDFA 20 which was of similar design to the two input EDFA's. The gain of the EDFA 20 was set to be 10.5 dB by adjusting the pump power. When all eight channels were present, the total input power was 5.5 dBm and the total output power was 16 dBm.

A 10% tap 22 was placed at the output end of the EDFA to monitor the output power for analysis. In the illustrative configuration of FIG. 1, the monitor channel and ASE were selected by a bandpass WDM 24 followed by filters 26, 28. In order to measure ASE accurately, two filters were used to pass a band of ASE centered around 1525.9 nm with a full wave half maximum (FWHM) of about 1 nm. A mid-stage filter in the EDFA blocked the ASE generated by the upstream EDFA's in this region. Accordingly, the ASE power measured has generated only in the second stage of the EDFA.

Figure 2:
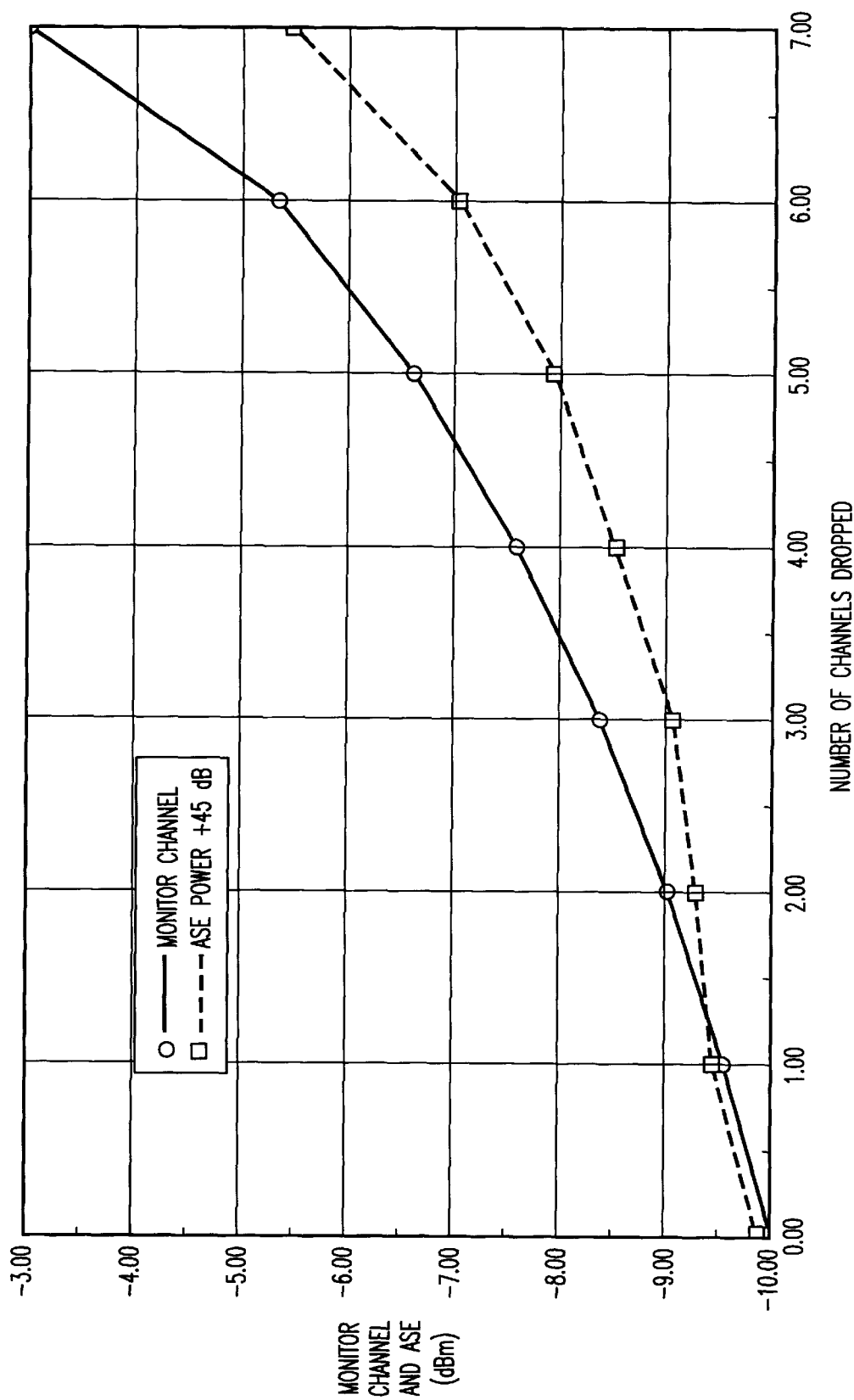
FIG. 2 is a graphical representation depicting the measurements of amplified spontaneous emission (ASE) in the illustrative system and multiple channels of FIG. 1 when the number of channels is decreased.

The powers observed in the monitoring system when channels are dropped are plotted in FIG. 2. When one channel is dropped, both the power in the monitor channel and the power in the ASE channel increased by about 0.5 dB due to the higher gain in the amplifier. This change is large enough to permit practical detection. If more channels are dropped, more of the amplifier's output power is available to be redistributed to fewer surviving channels. This means that the power increase is larger for each surviving channel, and the contrast for detecting the number of channels is better. The power change in the monitor channel is larger than that of the ASE because the signal in the monitor channel goes through both stages of the EDFA while the ASE is generated primarily in the second stage.

In the illustrative configuration of FIG. 1, in which two band-pass filters were employed as discussed above, the measured ASE power was lower than it would be in a practical system. Still, this power is deemed sufficiently large to illustrate the inventive method. The ASE power is, for example, expected to be improved by at least 3 dB with one single narrow band filter centered around the wavelength region that is blocked by the mid-stage filter of the two-stage EDFA.

Figure 3:
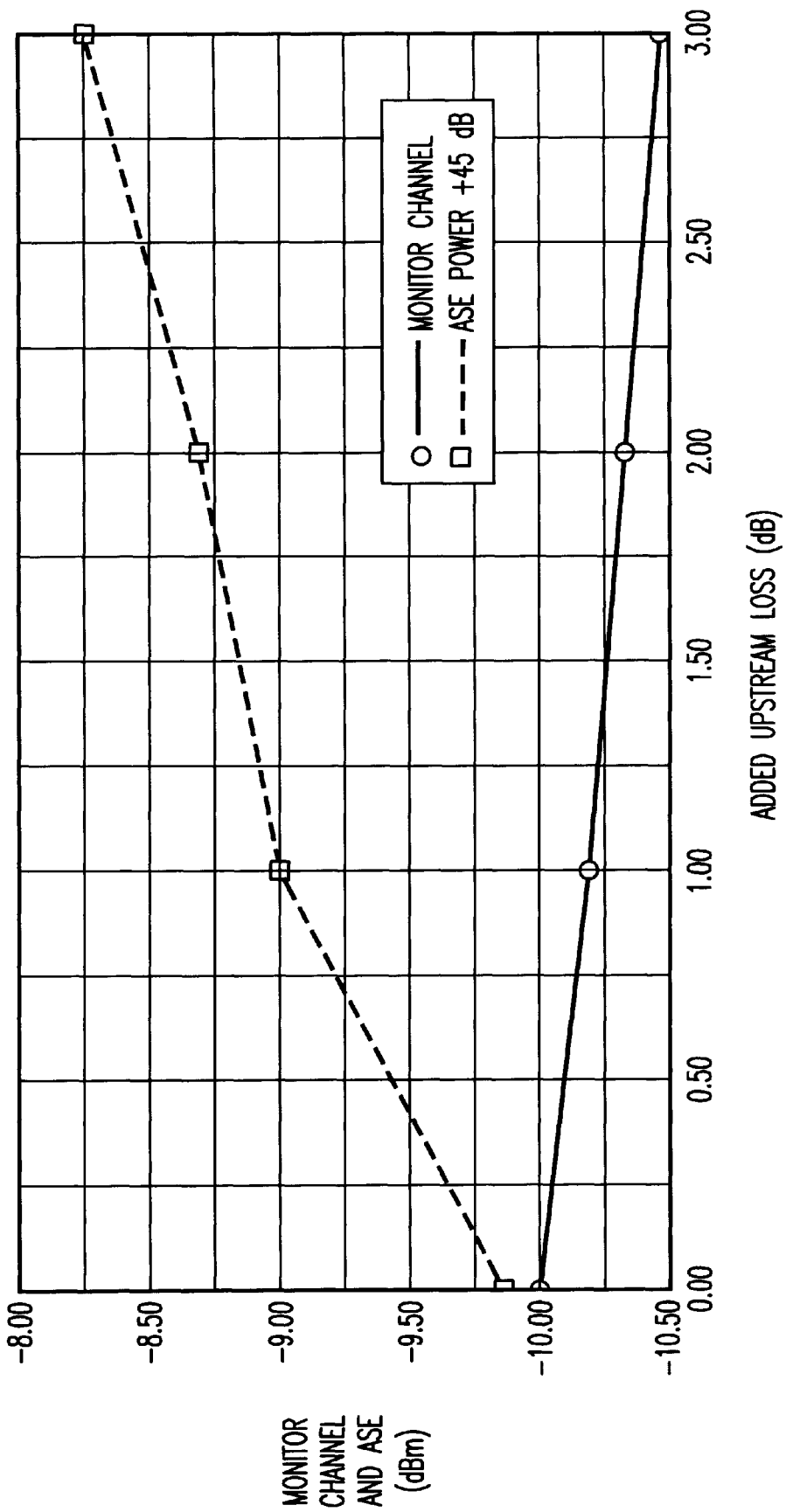
FIG. 3 is a graphical representation depicting the measurements of ASE power in the illustrative system of FIG. 1 when the total input power is decreased.

FIG. 3 shows the powers observed in the monitoring system when the total input power is decreased. When the upstream loss is increased, the power of the monitor channel decreases because of the lower input power while the ASE power increases because of the lower saturation and therefore higher gain. If the loss is increased by 3 dB, the power in the monitor channel is decreased by about 0.5 dB, and the power in the ASE channel is increased by more than 2 dB. Thus this case, in which the changes in monitor channel and ASE power have opposite signs, can be distinguished from the case of dropped channels when they change with same sign.

As will be readily appreciated by those skilled in the art, the inventive method discussed herein presumes the availability of a suitable monitor channel. In some optical networks, one channel is reserved for internal use by NC&M. In such networks, this channel is always present, making it the ideal choice as the monitor channel. For networks where no such preferred channel exists, of course, one of the signal channels can be chosen as the monitor channel. In case this original monitor signal channel is dropped, however, the monitor channel must be switched to one of the surviving channels.

The five cases for upstream loss and signal channel are tabulated in Table 1.

TABLE 1

|  | monitor channel power | ASE power |
| --- | --- | --- |
| upstream loss ↑ | ↓ | ↑ |
| upstream loss ↓ | ↑ | ↓ |
| number of other channels ↑ | ↓ | ↓ |
| number of other channels ↓ | ↑ | ↑ |
| drop of the monitor channel | 0 | ↑ |

From the foregoing, it will be readily appreciated by those skilled in the art that the method of the present invention permits network maintenance personnel to monitor the number of channels present at any amplifier in a WDM network. Such monitoring permits effective adjustment of the amplifier gain, for example, by adjusting the second stage pump power, in order to optimize the performance of surviving channels.

From the foregoing, it should be readily ascertained that the invention is not limited by the embodiments described above which are presented as examples only but may be modified in various ways within the intended scope of protection as defined by the appended patent claims.

What is claimed is:

1. A method of operating an optical communication network including an optical communication path having an upstream end and a downstream end and an optical amplifier interposed between the upstream end and the downstream end along the communication path, the method comprising the steps of:

transmitting a wavelength division multiplexed optical signal between said upstream end and said downstream end, said multiplexed optical signal having a plurality of optical channels;

receiving said wavelength division multiplexed optical signal at said optical amplifier;

monitoring, in a first monitoring step, at an output of said optical amplifier, changes in signal power in a first of said plurality of optical channels;

monitoring, in a second monitoring step, at the output of said optical amplifier, changes in amplified spontaneous emission (ASE) power generated in an ASE band by said optical amplifier; and determining whether one or more of the plurality of optical channels were added or dropped at the upstream end, or alternatively, whether signal loss was increased or decreased at the upstream end, solely on the basis of the changes to signal power in the first of said plurality of channels and the changes to ASE power generated by said optical amplifier.

2. The method of claim 1, wherein the optical amplifier is an erbium-doped fiber amplifier.

3. The method of claim 1, wherein said second monitoring step is performed by bandpass filtering the optical signal.

4. The method of claim 1, wherein at least one of said plurality of optical channels is modulated with digital data.

5. The method of claim 4, further comprising a step of receiving said multiplexed optical signal at said downstream end.

6. The method of claim 1, wherein the dropping of one or more channels upstream is identified in said determining step when the ASE power increases and the first channel signal power increases or drops to a null value.

7. The method of claim 1, wherein the adding of one or more channels upstream is identified in said determining step when the ASE power decreases and the first channel signal power decreases to other than a null value.

8. The method of claim 1, wherein an increase in upstream signal loss is identified in said determining step when the ASE power increases and the first channel signal power decreases to other than a null value.

9. The method of claim 1, wherein a decrease in upstream signal loss is identified in said determining step when the ASE power decreases and the first channel signal power increases.

10. The method of claim 1, wherein said first monitoring step is performed by bandpass filtering the optical signal.

11. The method of claim 1, further comprising the step of placing a monitor tap at the output end of the optical amplifier for monitoring the changes to first channel signal power and the changes to ASE power generated by said optical amplifier.

12. The method of claim 1, further comprising the step of interposing a mid-stage filter between the upstream end and the optical amplifier, said mid-stage filter being operative to block power in the ASE band in the upstream WDM optical signal from being input to the optical amplifier.

13. A system for monitoring a plurality of optical channels in a wavelength division multiplexed (WDM) optical signal present in an optical communication path of a communication network, the communication path having an upstream end and a downstream end, the system comprising:

an optical amplifier interposed between the upstream end and the downstream end of the communication path;

a monitor tap, placed at an output end of the optical amplifier to monitor one or more components of the optical signal;

a mid-stage filter interposed between the upstream end and the optical amplifier, said mid-stage filter being operative to block an amplified spontaneous emission (ASE) band in the upstream WDM optical signal from being input to the optical amplifier; and one or more bandpass filters interconnected to said monitor tap, said filters being capable of filtering from the output of the optical amplifier one of the plurality of optical channels in the WDM signal and a signal generated by the optical amplifier in the ASE band of the WDM signal.

14. The system of claim 13, wherein the optical amplifier is an erbium-doped fiber amplifier.

15. The system of claim 13, wherein the monitor tap is a ten percent tap.

16. The system of claim 13, wherein said one or more bandpass filters pass signals associated with an ASE band substantially centered at 1525.9 nanometers with a full wave half maximum of approximately one nanometer.

* * * * *

UNITED STATES PATENT AND TRADEMARK OFFICE
CERTIFICATE OF CORRECTION

PATENT NO. : 6,008,915
DATED : December 28, 1999
INVENTOR(S) : John Lehrer Zyskind It is certified that error appears in the above-identified patent and that said Letters Patent is hereby corrected as shown below:

Column 1,
Line 2, after the title insert -- ACKNOWLEDGEMENT OF GOVERNMENTAL RIGHTS --

This invention was made with Government support under Agreement No. 972-94-3-0036 awarded by ARPA. The Government has certain rights in the invention.

Signed and Sealed this

Twenty-seventh Day of November, 2001

Attest:

NICHOLAS P. GODICI
*Attesting Officer*     *Acting Director of the United States Patent and Trademark Office*